United States Patent

[11] 3,615,347

| [72] | Inventors | Walther Schmidt;<br>Hubert Martin, both of Richmond, Va. |
|---|---|---|
| [21] | Appl. No. | 792,769 |
| [22] | Filed | Jan. 21, 1969 |
| [45] | Patented | Oct. 26, 1971 |
| [73] | Assignee | Reynolds Metals Company<br>Richmond, Va. |

[54] METHOD OF MAXIMIZING POWER UTILIZATION IN THE ELECTRIC ARC PRODUCTION OF ALUMINIUM-SILICON ALLOYS
6 Claims, No Drawings

[52] U.S. Cl. .................................................. 75/10, 13/33
[51] Int. Cl. ...................................................... H05b 7/18
[50] Field of Search .......................................... 75/10, 65, 68, 143, 11, 12; 13/9, 33

[56] References Cited

UNITED STATES PATENTS

| 2,805,142 | 9/1957 | Arata ........................... | 75/11 |
| 3,116,997 | 1/1964 | Kohlmeyer ................... | 75/10 |
| 3,232,746 | 2/1966 | Karlovitz ...................... | 75/11 |
| 3,254,988 | 6/1966 | Schmidt ........................ | 75/68 |
| 3,257,199 | 6/1966 | Schmidt ........................ | 75/93 |

FOREIGN PATENTS

| 545,220 | 8/1957 | Canada ........................ | 75/10 |
| 894,487 | 4/1962 | United Kingdom .......... | 75/10 |

*Primary Examiner*—Winston A. Douglas
*Assistant Examiner*—Peter D. Rosenberg
*Attorney*—Glenn, Palmer, Lyne, Gibbs & Thompson ABSTRACT: This application discloses a novel method for preparing alloys of 3and silicon in an electric furnace from a feedstock containing oxides of the relevant metals, carbon, and a metallic component. In this method, to the feedstock, which contains an oxidic component and sufficient carbon to reduce the oxidic component, the oxidic component containing alumina and silica in a ratio to about 2.0 to 6.0 parts of $Al_2O_3$/1 part $SiO_2$, there is added a metallic silicon compound and the arc furnace is operated with at least one electrode having an arc voltage E and an amperage I, determined for the current flowing in the individual electrode, having a ratio of $E^3/I$ of about 2 to 10.

METHOD OF MAXIMIZING POWER UTILIZATION IN THE ELECTRIC ARC PRODUCTION OF ALUMINIUM-SILICON ALLOYS

BACKGROUND OF THE INVENTION

It is known that a mixture of alumina and silica may be reduced with carbon in an electric arc furnace at a temperature of about 1900–2100° C., to yield an alloy of aluminum and silicon. Temperatures lower than this range thermochemically favor the production of aluminum carbide and oxycarbides. Thus, it is desirable to operate the furnace in such a manner that a high energy output is confined to a furnace space close to the one or more electrodes, thereby preventing waste of energy due to stray electric current which can create a substantially large zone within the furnace having the lower temperatures conducive to carbide formation.

The art previously has recommended the use of low voltages and large electrode diameters in order to provide a confined space underneath the electrode and in a fringe around the periphery of its lower end. Large electrodes are supposed to allow the accommodation of feed material, preferably in briquetted form, within a concentrated space in which the desired temperature of around 2000° C. is reached. The low voltage is supposed to keep the electrode low in the mass, thus providing a confined reaction zone. Low voltage also prevents current from being dissipated into portions of the conductive charge radially removed from the confined reaction zone. It has been realized in arc furnace smelting that a certain relation should be maintained, linking the power load (expressed in kilowatts) with the horizontal electrode cross section (expressed in square inches). This relation is generally known as kw. density. If this value is too high, more energy is concentrated in the space around the electrode where the reaction takes place than the feed materials can absorb per unit of mass and time considering the practically possible rate of feeding. Too high a power concentration results in waste, not only of energy but also of materials, because of heavy vaporization losses.

Though the desirable conditions for producing Al-Si alloys are known in a general way, there are severe limitations in their practical realization; specifically, if larger commercial furnaces with higher kw. loads are to be operated. The size of prebaked electrodes is limited by available standards for which anything above 45 inches diameter is extraordinary. Continuous electrodes of the Soederberg type, while proving to be effective in some instances up to about 120 inches diameter, require a minimum current of about 20–35 amps per square inch to insure proper in situ baking. This factor, in context with the allowable voltage, narrows the freedom of choice for a desirable kilowatt density.

Former attempts to develop a correlation between furnace and electrode size and power input have been made, often with less than optimum results. U.S. Pat. No. 2,488,568, for example, uses a so-called "R factor" which is defined as follows:

$$R = \frac{E \pi D}{I}$$

wherein $E$ equals the potential drop from electrode to hearth in volts, $I$ equals the current per electrode in amperes and $D$ equals the electrode diameter in inches. However, this formula would assume a freedom of choice in varying $E$ and $D$ independently as long as their product remains constant. Although workers in the art have made attempts to specify various values in the above formula when smelting alumina-silicon alloys, nevertheless, the range of values reported by the prior art workers is too wide to successfully permit the design of a furnace for any desired capacity and for its successful operation. In contrast, the present invention is predicated upon the fact that $E$ and $D$ have a fixed relation to each other which cannot be changed at will.

Another defect of prior art processes represented by U.S. Pat. No. 2,488,568 is that they used a fused bath and a carbon-starved system, i.e., a system employing much less than the stoichiometric amount of carbon needed to reduce the charged oxides. The rest of the carbon is provided by the electrode with a tending high consumption of expensive electrode carbon.

DESCRIPTION OF THE INVENTION

Too high a restriction of carbon in the feed is a dangerous measure for sustained furnace runs, because it leads inevitably to accumulations of unreduced oxides and oxicarbides. In contrast, the present invention recommends operation with approximately 90–100 percent of the stoichiometric amount of carbon calculated on the oxides contained in the feed, the rest being provided by the electrode. This invention also stipulates specific compositions of feed materials, the use of which further improves operational characteristics in the production of Al–Si type alloys with more than 50 percent Al. Advisably, the feed is briquetted and the carbon is powderized and mixed with the likewise comminuted oxides. It is noted, however, that this invention includes local additions of oxides, e.g., quartz and lumps of coal or charcoal in a manner known to the art.

In accordance with the process of this invention, a furnace is operated with at least one electrode using an arc voltage $E$ and an amperage $I$ determined for current flowing in the individual electrode in accordance with the following ratio:

$$C = E^3/I$$

If alternating current is used, $C$ ranges from about 2 to 6, preferably from about 3 to 4. If direct current is used, the arc does not spread as much as with alternating current and is more concentrated underneath the electrode. Therefore, $C$ can range from about 3 to about 10, preferably from 4 to about 6.

The arc voltage is a figure which is calculated by multiplying the voltage from the transformer with a power factor and deducting the voltage drop due to the ohmic resistance of bus bars and electrodes. Thus, the arc voltage E equals the transformer voltage $E_T$ times the power factor F minus the ohmic voltage drop in conductors ($Er$). In AC furnaces the power factor (F) is usually 0.75–0.80 for optimum operations. The power factor may be compensated at least in part by the installation of capacitors or other devices. Where direct current is used, the power factor is unity so that the arc voltage E is equal to the voltage as tapped from the rectifiers or other source of DC minus the voltage drop due to the ohmic resistance of the conductors.

Quite obviously, when employing a three-phase furnace, each electrode should have an arc voltage and current falling within the above-described limits.

It has also been found that optimum furnace operation in accordance with the process of this invention necessitates that the electrode or electrodes employed have certain critical dimensions. For electrodes of cylindrical shape, the most common type, it has been found that excellent results are obtained when the diameter of the electrode in inches is substantially numerically equal to the arc voltage in volts. The reason for this is not understood but the recognition of this fact makes it extremely simple for a furnace operator to obtain successful runs.

The amount of variation of the diameter of the electrode in inches with the arc voltage in volts, which can be tolerated depends on whether AC or DC current is being used. The following relations have been found:

for AC   $D=E\pm10\%$

For DC   $D=0.88\ E\pm10\%$ where $D$ is the diameter of the electrode in inches and $E$ is the arc voltage in volts.

If furnace runs are attempted using electrodes having diameters falling outside the above limits, problems will arise. It has been found that too large an electrode results in the accumulation of partially reduced oxides and too small an electrode results in higher vaporization losses, excessive consumption of the electrode and damage to the furnace hearth because of excess heat.

In some furnace designs, it may be advantageous to use other electrode shapes than cylindrical ones, especially for very large furnace sizes equipped with Soederberg-type electrodes. Such shapes include rectangular or oval or elliptical cross sections. In such cases, the above given relation is used to determine first D for a cylindrical shape and then apply $\pi D$ as the circumference for the elected shape. E.g., if D, determined from the above given relation, is 75 inches, a rectangle about 70 inches × 48 inches would have approximately the same circumference, but almost one-fourth less cross section, being more convenient both as to the mechanical load and to the current density required for baking the Soederberg electrode. It is evident that the relation between the circumference and the arc voltage, offered by this invention, is a more flexible design element than the formerly recommended use of kw./sq. in., which is also more difficult to apply to other than cylindrical shapes.

The feedstocks used in this invention to produce aluminum-silicon alloys are, in general, more conductive, that is, offer less resistance to passage of electricity than feeds proposed in the aforementioned U.S. Pat. No. 2,488,568. It has been found desirable to use a feed containing a metallic component which thereby is more conductive and allows passage of current at the specified low voltages while still affording a distance between the carbon electrode or electrodes and the conductive hearth sufficiently restricted to reduce the feedstock to the desired alloy at a commercially acceptable rate. As a metallic component, the additives described in U.S. Pat. Nos. 3,254,988 and 3,257,199 are preferred. These patents describe methods of smelting mixtures of $Al_2O_3$ and $SiO_2$ to which metallic additives are added in the form of free metals and/or intermetallic compounds. Such additives comprise silicon with or without admixture with substantially fully satisfied intermetallic complexes of aluminum and silicon. Such complexes can be based on intermetallic compounds of Fe, Ti, Cr, Mn with Al and Si. As is evident from these patents, the metallic component may conveniently be obtained as rejected products resulting from the refining of raw Al-Si alloys, so that it is advisably used in cycles, i.e., being added in the smelting step and reclaimed in the refining steps.

As may be seen from these patents, the presence of a substantial silicon content within such smelting feedstock allows a change in the ratio of the oxidic part of the furnace feed to permit less $SiO_2$. In this invention, the ratio of alumina and silica in the oxidic feed material is about 2 to 6 parts $Al_2O_3$ to 1 part $SiO_2$. To this oxidic feedstock, is added at least one metallic component of substantial silicon content, including Si metal, Al-Si alloys of at least about 11.6 percent Si, which is the eutectic composition, etc. It is preferred that the amount of elemental silicon added should be between 6-23 percent of the combined weight of the alumina and silica. Other Si-containing additives are intermetallic complexes of Si and Al with at least one element selected from Fe, Mn, Cr and Ti like the most common compound $FeAl_3Si_2$. Other compositions are given in U.S. Pat. No. 3,257,199. The metallic component of the feedstock can also be or include silicides, notably of Ti and Ca like $TiSi_2$ and $CaSi_2$. Furthermore, silicon carbide may be used. These additional metals or metal compounds, when used, function as scavengers, and the metallic component adds to the bulk and weight of the alloy, making it easier for the reduced metal to coalesce into a pool of liquid which facilitates the tapping operations. The metallic additive serves also to reduce the vapor pressure of Al, thereby minimizing loss of aluminum due to vaporization from the reactor.

As pointed out in U.S. Pat. Nos. 3,254,988 and 3,257,199, silicon is necessary in the additive both for chemical and physical reasons. There must be a certain Si level in the feed in order to counteract the formation of too much aluminum-carbide. Not all of this needs to be in the form of $SiO_2$, so a part can be provided by Si metal or additives containing Si metal. The substitution of a substantial part of otherwise needed $SiO_2$ by such additives increases the melting temperature of the $Al_2O_3$-$SiO_2$ mixture hereby permitting the feed briquettes to maintain substantially their distinct particulate identity without fusing together before they have become metal. This facilitates the escape of CO gas from the furnace, thus minimizing back reactions of reduced Al with CO.

The metallic component is admixed to the furnace feed usually in amounts large enough to provide 10–40 percent of the weight of the resulting alloy, the rest being provided by the reduction of the oxide feed. The additive may be powdered and mixed into the briquettes or it may be added in the same way as iron is added in furnaces smelting ferroalloys, like ferrosilicon, i.e., as an individual additive in particulate form or chunks. The additive also may be divided and partly incorporated in the briquettes, partly added as individual pieces. It is preferred to use additives in which the content of Si metal is between 25 and 80 percent, or more preferably, 50–80 percent, of the total weight of the additive, the rest being substantially Fe, Ti, Al and C.

The carbon component often will be a mixture of various types, for example, a mixture of two-thirds to three-fourths anthracite or bituminous coal with one-third to one-fourth charcoal has proved effective.

The invention will be better understood from a consideration of the following examples, which are to be considered illustrative and not limiting.

EXAMPLE 1

A 6,000-kw. single-phase AC electric arc furnace is charged with feed in accordance with Example II of U.S. Pat. No. 3,254,988 in order to make an Al-Si alloy. The carbonaceous reducing agent charged is equal to 95 percent of stoichiometric based on the oxides contained in the feed, the remainder being supplied by the electrode.

For this 6000 kw. furnace, the arc voltage E is calculated from the known relationship $EI$=6000 kw. and from the relationship of this invention:

$$C=E^3/I$$

Solving, the above two equations, for a preferred value of $C=3$, results in the following:

$$E=65 \text{ v.}$$
$$I=92.1 \text{ ka.}$$

The furnace is then set so as to provide the above-calculated voltage and current in accordance with known techniques.

The electrode chosen is of cylindrical shape and has a diameter determined by the ratio:

$$D_{(inches)}=E_{(volts)}\pm 10\%$$

In this example an electrode having a diameter of 65 inches was used.

A furnace operation in accordance with the above-described settings was found to be smooth and continuous. No excessive amounts of semireduced material like silicon carbide accumulated on the furnace hearth. No excessive vapor losses occurred nor is the hearth damaged because of excessive heat.

EXAMPLE 2

The process of example 1 is repeated with the exception that a C-value outside the range of this invention is chosen. The specific C-value chosen is 1.4.

Using the C-value of 1.4 the arc voltage and current is calculated to be the following:

$$E=54 \text{ v.}$$
$$I=110 \text{ KA.}$$

The same 65-inch diameter electrode of example 1 is used. When the furnace is operated under these conditions, it is found that continuous furnace operation is impossible because the electric arc starts to burn out the carbon hearth. Furnace operation has to be discontinued within 72 hours and vaporization losses are increased more than 50 percent when compared to those of example 1.

EXAMPLE 3

The procedure of example 1 is repeated with the exception that a C-value was chosen which is above the range specified in the novel process of this invention. The particular C-value chosen for this example is C=8.8.

Using this C-value and calculating for arc voltage and current gives the following results:

$E=85$ v.

$I=70$ ka.

A 65-inch diameter electrode is employed.

Continuous furnace operation at these conditions is impossible because undue accumulation of semireduced material, primarily silicon carbide, including oxycarbides on the furnace hearth is found to occur. The presence of these materials on the furnace hearth forces the electrode tip to a progressive higher position making the removal of the reduced alloy impossible since semireduced materials block the passage to the taphole. Furnace operation under these conditions becomes impossible within about 72 hours.

EXAMPLE 4

This example will illustrate the importance of the electrode diameter.

The procedure of example 1 is repeated with the only change being that an electrode is used which had a diameter of 50 inches. Thus, the current and arc voltage fell within the preferred ranges of this invention but the diameter of the electrode is outside the relationship of $D_f = E \pm 10$.

Continuous furnace operation is impossible because the electric arc energy is concentrated in too small a volume. Vaporization losses are increased by more than 30 percent when compared to those of example 1. Additionally, the furnace hearth is found to be damaged because of the high energy concentration.

EXAMPLE 5

The procedure of example 4 is repeated with the exception that a larger electrode than that falling within the limits of this invention was employed. In this example an electrode having a diameter of 75 inches is used.

This procedure resulted in incomplete reduction of oxides because of the fact that the arc energy is dissipated over too large a volume. Undesirable effects such as those described in example 3 occur.

EXAMPLE 6

Example 1 is repeated with the exception that the furnace feed is that set forth in example 1 of U.S. Pat. No. 3,254,988. Excellent results are obtained.

EXAMPLE 7

Example 1 is repeated with the feed of example 1 of U.S. Pat. No. 3,257,199. Excellent results are obtained.

What is claimed is:

1. In a process of producing an alloy substantially of Al and Si and in which the content of Al is at least 50 percent, said alloy being produced by carbothermic reduction within an arc furnace from a feedstock containing an oxidic component and carbon sufficient to reduce said oxidic component, said oxidic component containing alumina and silica in a ratio of about 2.0 to 6.0 parts $Al_2O_3$/1 part $SiO_2$, which comprises adding to the feedstock a metallic silicon component of substantial silicon content and operating the arc furnace with at least one of the electrodes having an arc voltage E in volts, and an amperage I in amperes, determined for the current flowing in the individual electrode, having a ratio $E^3/I$ of about 2 to 10.

2. A method according to claim 1 in which the metallic silicon component is selected from the group consisting of silicon, aluminum-silicon alloys of at least as much Si as corresponds to the eutectic composition, intermetallic compounds of Si and Al with at least one element selected from Fe, Mn, Cr and Ti, silicides of Ti and Ca and silicon carbide.

3. A method according to claim 2 in which the metallic silicon component contains at least about 50 percent silicon.

4. A method according to claim 1 in which the numerical value $E^3/I$ equals about 2 to 6 for alternating current and about 3 to 10 for direct current.

5. A method according to claim 1 in which the metallic component contains up to 50 percent intermetallic compounds of Si and Al with at least one element selected from Fe, Mn, Cr and Ti, and the numerical value for $E^3/I$ equals 2 to 10.

6. A method according to claim 1 in which the furnace is operated with at least one of the electrodes being of cylindrical shape and having a diameter in inches equaling $E \pm 10$ percent for alternating current and $0.88E \pm 10$ percent for direct current.

* * * * *